United States Patent
Cox et al.

(10) Patent No.: US 6,170,833 B1
(45) Date of Patent: Jan. 9, 2001

(54) HUB SEAL WITH MACHINABLE THRUST RING AND LAY-DOWN SEALING LIP

(75) Inventors: Jon A. Cox, Longview; C. Leon Lovett, Gilmer; Mark N. Gold, Hallsville; Laurence B. Winn, Longview, all of TX (US)

(73) Assignee: Stemco Inc, Longview, TX (US)

( * ) Notice: Under 35 U.S.C. 154(b), the term of this patent shall be extended for 0 days.

(21) Appl. No.: 09/048,379

(22) Filed: Mar. 26, 1998

Related U.S. Application Data

(63) Continuation-in-part of application No. 08/957,807, filed on Oct. 24, 1997.

(51) Int. Cl.$^7$ ...................................... F16J 15/32
(52) U.S. Cl. ........................ 277/551; 277/559; 277/571
(58) Field of Search ................................... 277/551, 559, 277/571

(56) References Cited

U.S. PATENT DOCUMENTS

| | | | |
|---|---|---|---|
| 3,021,161 | * | 2/1962 | Rhoads et al. ................. 277/571 X |
| 3,572,730 | * | 3/1971 | Otto et al. ........................ 277/559 |
| 3,586,342 | * | 6/1971 | Staab et al. ...................... 277/559 |
| 3,633,927 | * | 1/1972 | Van Deven et al. .............. 277/559 |
| 3,785,660 | * | 1/1974 | Bush ................................. 277/559 |
| 4,132,421 | | 1/1979 | Corsi et al. . |
| 4,183,892 | | 1/1980 | Corsi et al. . |
| 4,208,057 | * | 6/1980 | Messenger et al. .............. 277/551 |
| 4,226,426 | * | 10/1980 | Messenger et al. ............. 277/551 |
| 4,243,235 | | 1/1981 | Repella . |
| 4,440,405 | | 4/1984 | Schaus et al. . |
| 4,441,722 | | 4/1984 | Pichler . |
| 4,497,496 | | 2/1985 | Bepella . |
| 4,501,431 | | 2/1985 | Peisker et al. . |
| 4,591,168 | | 5/1986 | Hölzer . |
| 4,695,063 | | 9/1987 | Schmitt et al. . |
| 4,705,277 | | 11/1987 | Repella . |
| 4,709,930 | | 12/1987 | Forch . |
| 4,721,314 | | 1/1988 | Kanayama et al. . |
| 4,739,998 | | 4/1988 | Steusloff et al. . |
| 4,783,086 | | 11/1988 | Bras et al. . |
| 4,844,480 | | 7/1989 | Gralka . |
| 4,906,009 | | 3/1990 | Saitoh . |
| 5,015,001 | | 5/1991 | Jay . |
| 5,024,364 | | 6/1991 | Nash . |
| 5,056,799 | | 10/1991 | Takenaka et al. . |
| 5,190,299 | | 3/1993 | Johnston . |
| 5,195,757 | | 3/1993 | Dahll . |
| 5,209,449 | | 5/1993 | Ruff, Jr. et al. . |
| 5,427,387 | | 6/1995 | Johnston . |
| 5,577,741 | | 11/1996 | Sink . |
| 5,615,894 | | 4/1997 | von Schemm . |

* cited by examiner

*Primary Examiner*—Anthony Knight
*Assistant Examiner*—Vishal Patel
(74) *Attorney, Agent, or Firm*—Cummings & Lockwood

(57) ABSTRACT

A hub seal for installation on the wheel end of a heavy duty trailer or truck is disclosed which includes an annular casing, an elastomeric sealing ring supported within the annular casing and including an axially extending sealing lip, an annular sleeve mounted coaxial with the annular casing, the annular sleeve having an axially extending sealing surface, and a spring for biasing the axially extending sealing lip against the axially extending sealing surface such that a substantial portion of the sealing lip is in sealing engagement with the sealing surface over a substantial contact area.

27 Claims, 8 Drawing Sheets

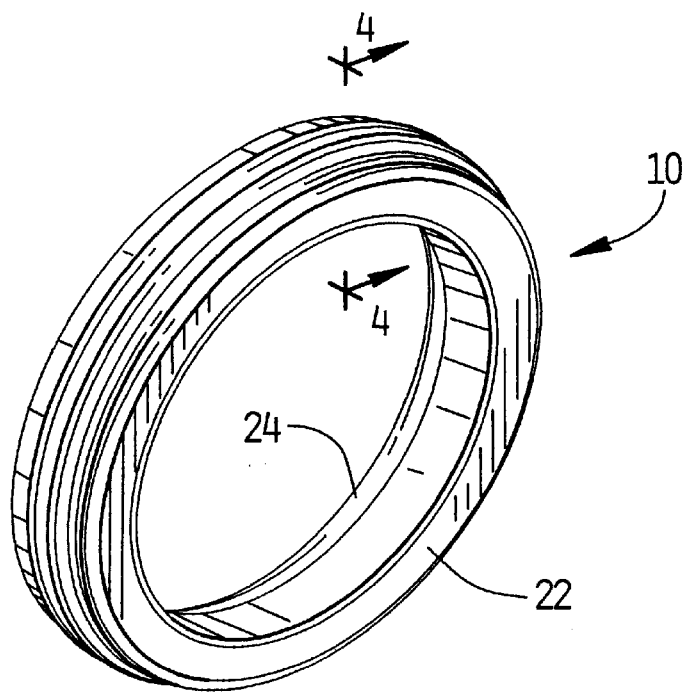
FIG_1
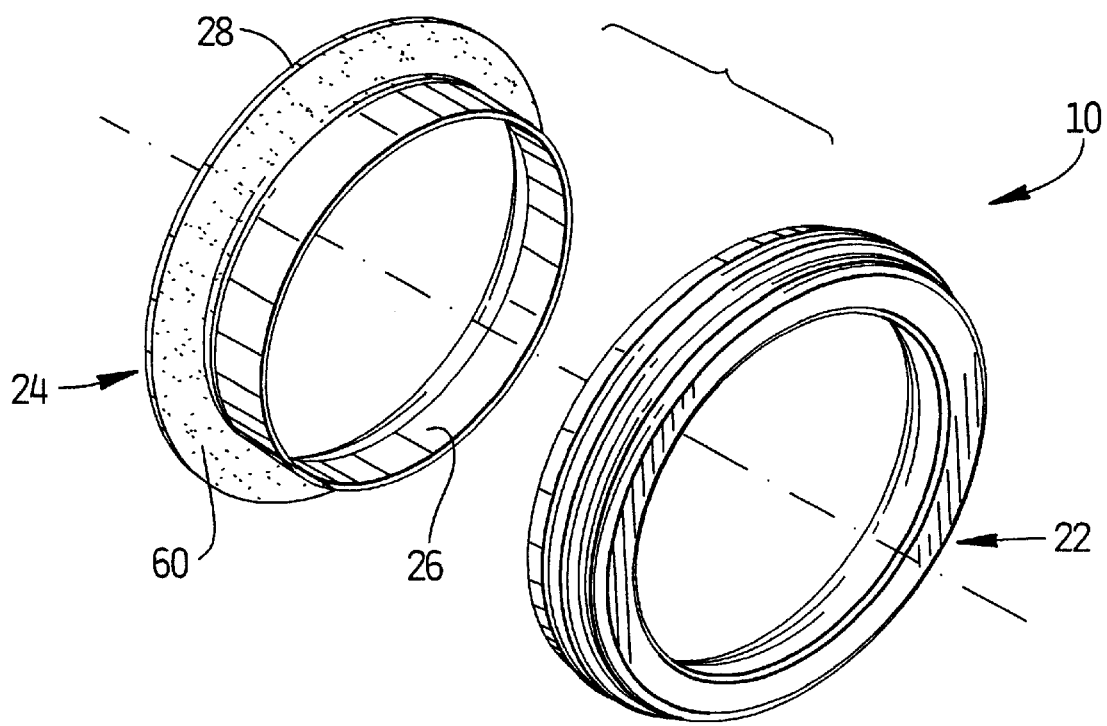
FIG_2

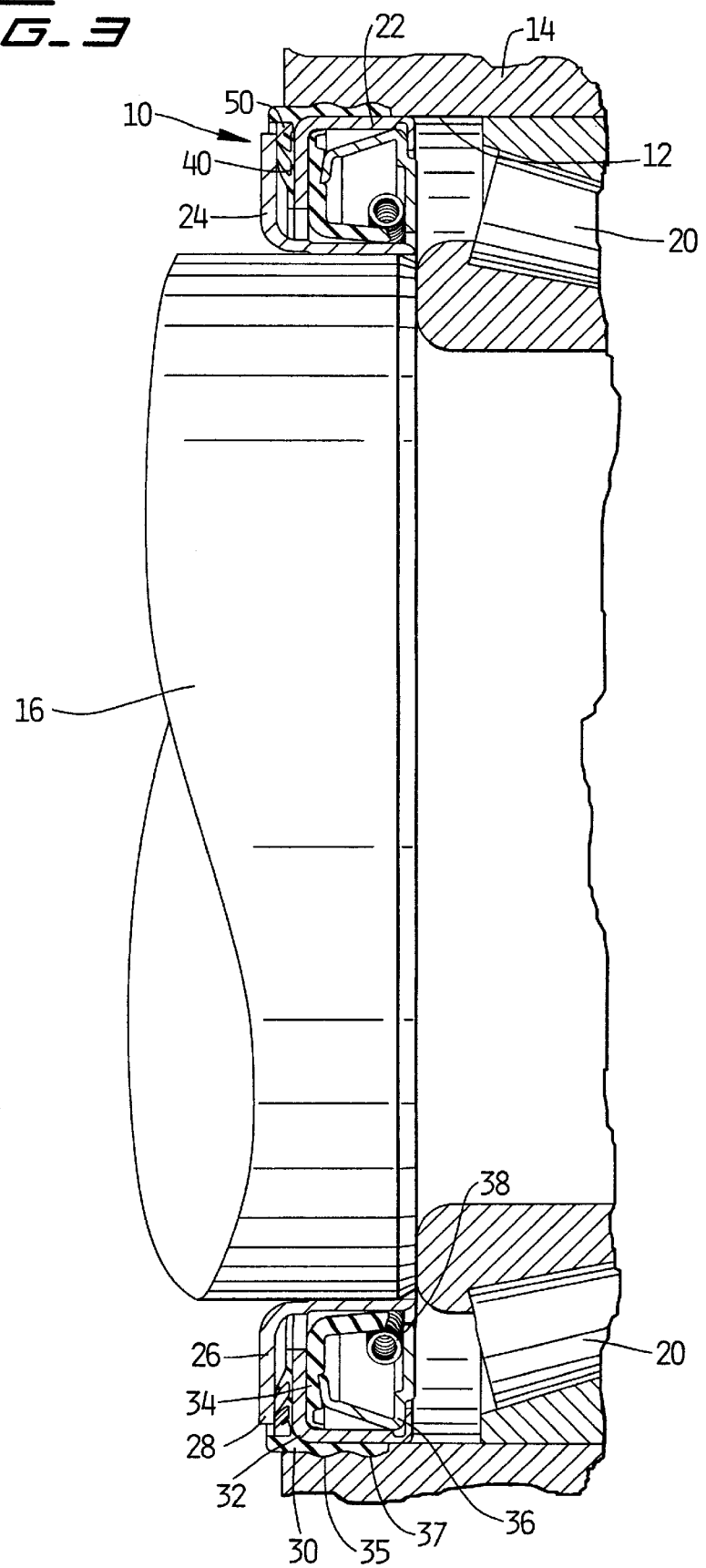

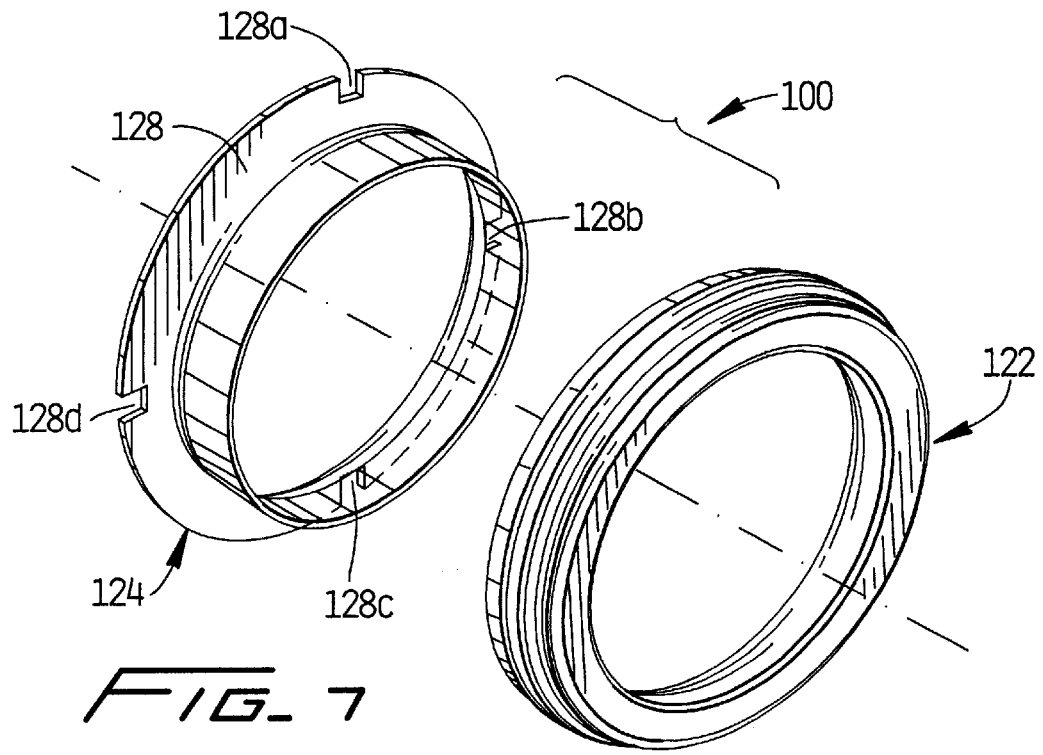
FIG_7
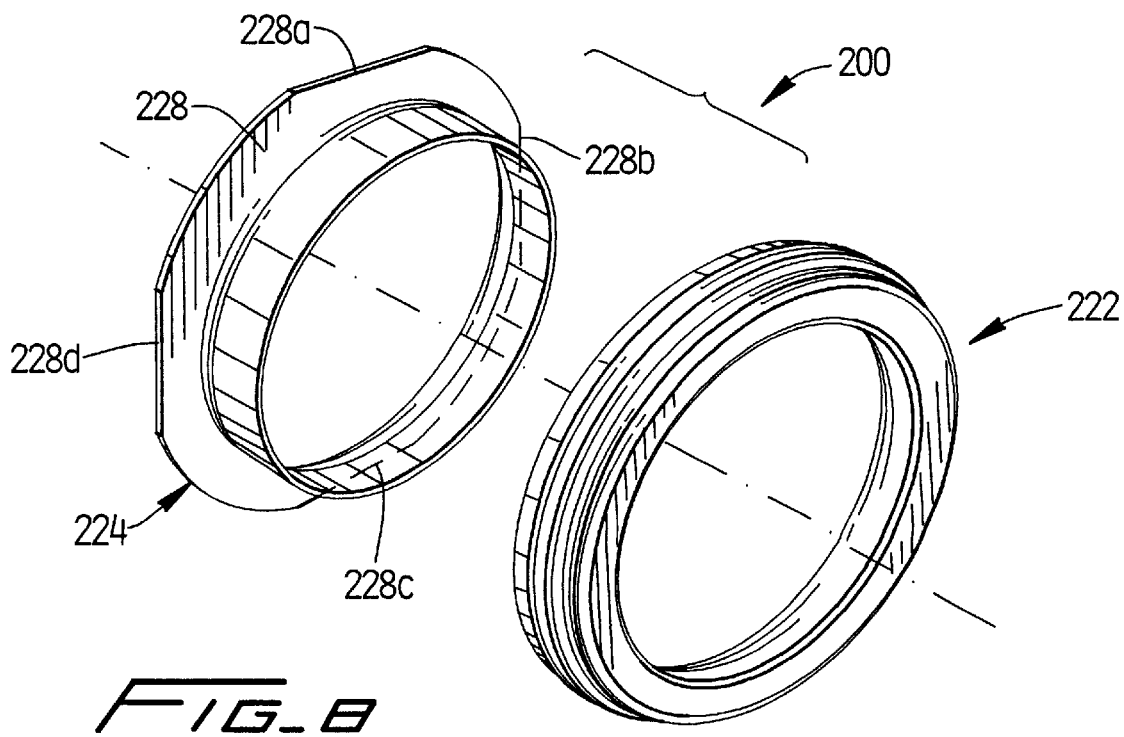
FIG_8

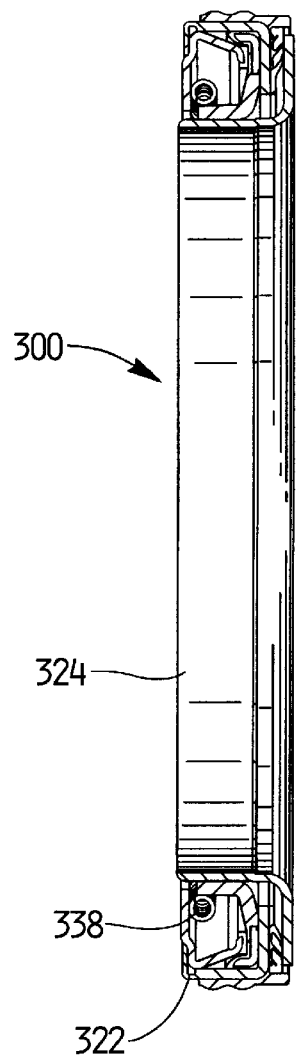
FIG_9
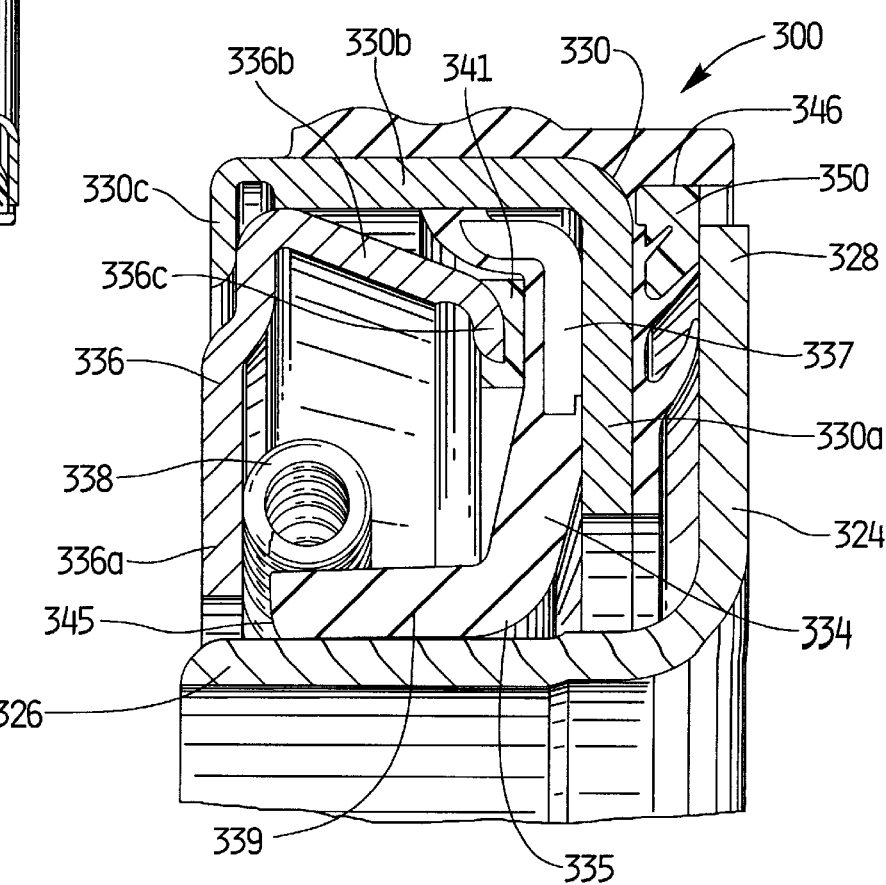
FIG_10

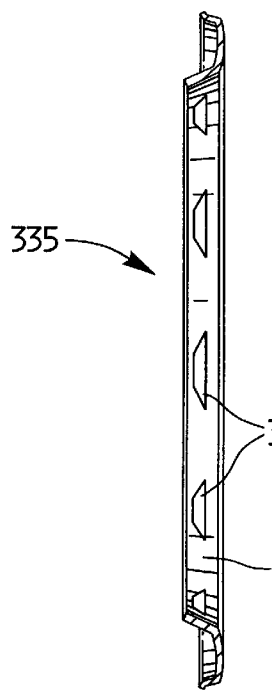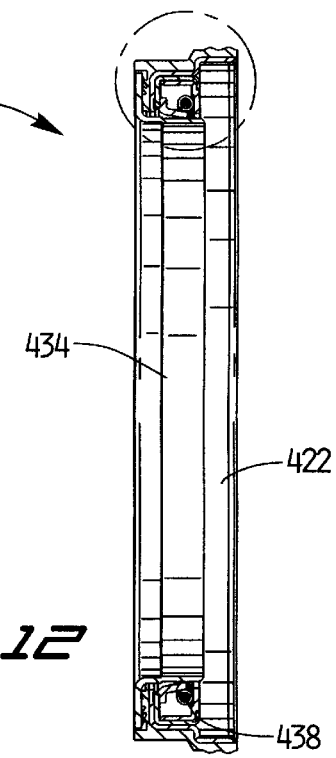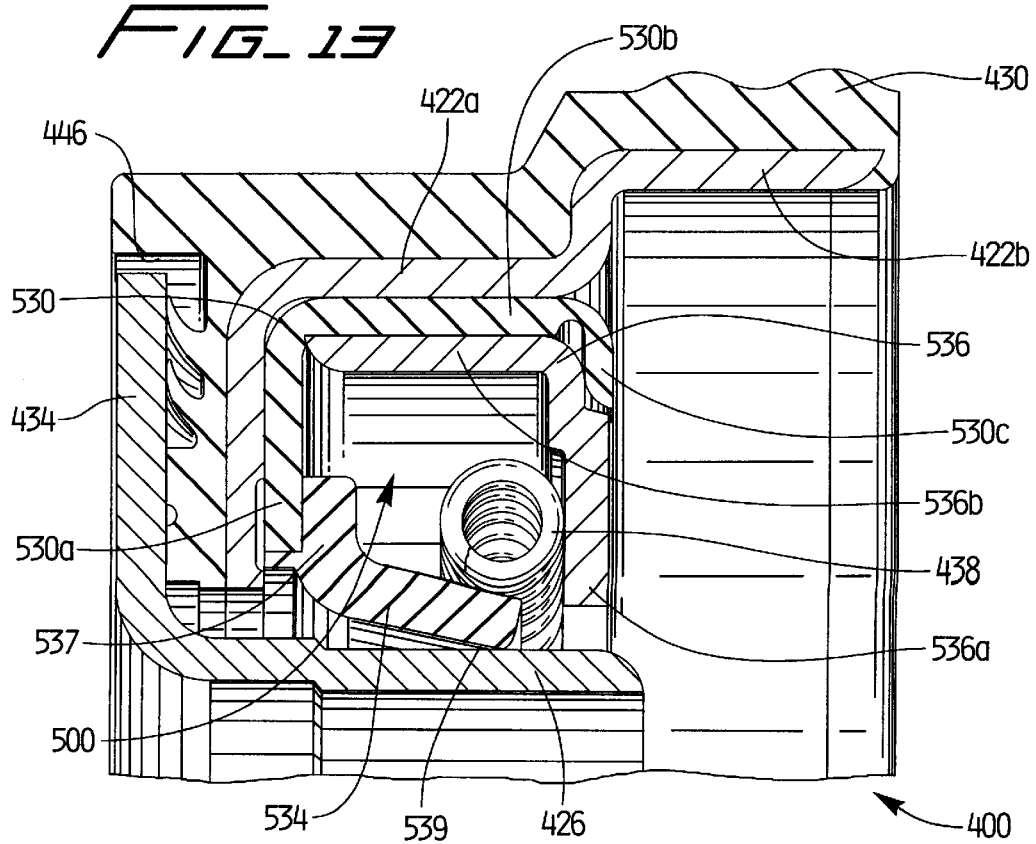

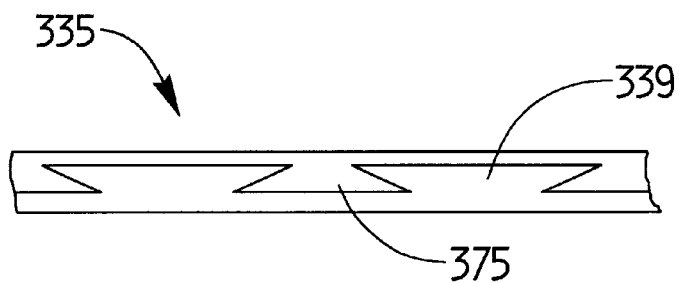
FIG_16
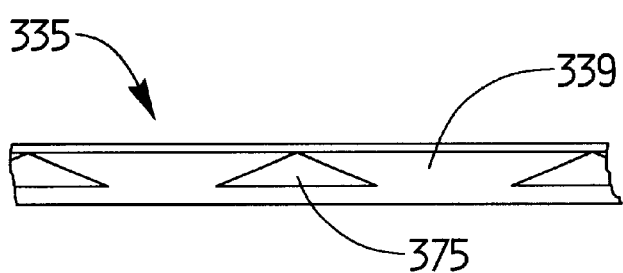
FIG_17
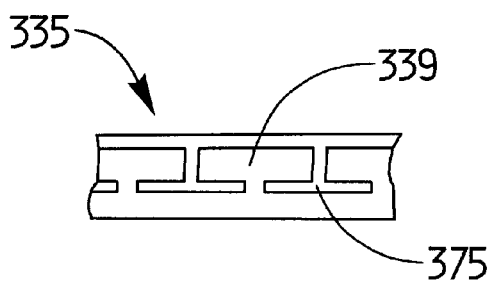
FIG_18

HUB SEAL WITH MACHINABLE THRUST RING AND LAY-DOWN SEALING LIP

CROSS-REFERENCE TO RELATED APPLICATIONS

The subject application is a continuation-in-part of copending U.S. application Ser. No. 08/957,807 which was filed on Oct. 24, 1997.

BACKGROUND OF THE INVENTION

1. Field of the Invention

The subject invention relates to a hub seal, and more particularly, to a hub seal having a machinable thrust ring which reacts to axial loads imposed during installation of the hub seal on the wheel end of a vehicle, and which is partially removed through shearing action during the break-in period of the seal. The hub seal includes a lay-down lip seal formed from an elastomeric material.

2. Background of the Related Art

In tractor and trailer wheel end axle assemblies, particularly those employed on large trailers, semi-trailers and tractors, the wheel is mounted on a fixed axle for rotation thereabout. The hub of the wheel defines a lubricant chamber about the end of the axle in association with the wheel bearings. A quantity of lubricant is maintained in the lubricant chamber to continuously bathe the bearings. A hub cap is used to enclose the lubricant chamber and a shaft seal is fit onto the axle to effect a dynamic seal between the axle and the lubricant chamber.

Shaft seals are well known in the art, and generally include a wear member or sleeve and a seal member or casing. The casing is mounted to rotate with the wheel hub relative to the sleeve member. The casing has an outer diameter which is designed to provide an interference fit with the wheel hub and the sleeve is dimensioned to be press fit onto the wheel axle. An early example of a unitized shaft seal in which the wear member and seal member are constructed as a one-piece assembly is disclosed in U.S. Pat. No. 3,685,841 to Keller. Later examples of semi-unitized shaft seals in which the wear member and seal member can be disassembled for repair and inspection are disclosed in U.S. Pat. Nos. 4,208,057 and 4,252,329 to Messenger.

It is known in the prior art, as illustrated in each of the above-identified patents, to provide the seal member with elastomeric bumper elements that serve to maintain the axial spacing of the wear member and seal member, as well as absorb the axial load exerted upon the seal member when the seal assembly is press fit onto the axle shaft. Upon installation, the bumper elements are compressed and during the initial break-in period of the seal assembly, the bumper elements are partially worn away to provide a minimal running clearance between the wear member and the seal member.

During the break-in period, the elastomeric bumper elements generate significant resistance to rotation between the sleeve and casing. This resistance generates heat and must be overcome by increasing the torque applied between the sleeve and casing. The increased heat can have an adverse effect on the integrity of the seal and the increase in torque has an adverse effect on vehicle efficiency. In addition, the particulate material worn away from the bumper elements can contaminate the bearing chamber and cause damage to the seal assembly.

U.S. Pat. No. 5,015,001 to Jay discloses a seal assembly which includes an annular bumper element formed from a fusible material which transitions via frictional heating from a solid to a liquid during the break-in period. During break-in, it can take a considerable amount of time and applied torque to sufficiently elevate the temperature of the bumper element to a induce a phase change. This can have an adverse effect on vehicle efficiency. Clearly, there is a need in the art for a hub seal of the type having a bumper element that can be removed during the break-in period without causing an increase in torque and without generating excessive heat.

It is also known in the art of hydrodynamic shaft seals to provide a radial lip element in sealing contact with the axial sealing surface of a wear sleeve to prevent lubricating fluid from migrating along the sealing surface. In general, there are two types of radial lip elements employed in shaft seals. The first type provides one or more thin bands of contact between the sealing lip and the sealing surface of the wear sleeve. Examples of such seals are disclosed in U.S. Pat. No. 4,695,063 to Schmitt et al., U.S. Pat. No. 4,844,480 to Gralka, and U.S. Pat. No. 4,906,009 to Saitoh and U.S. Pat. No. 5,427,387 to Johnston.

The second type provides a deformable lip element which, upon installation, is deflected from its normal orientation into sealing contact with a circumferential area of the axial sealing surface of the wear sleeve. Deformable radial lip seals of this type are commonly referred to as "lay-down" lip seals and are typically fabricated from a synthetic resin material such as polytetrafluoroethylene (PTFE). Examples of such seals are disclosed in U.S. Pat. No. 4,591,168 to Hölzer and U.S. Pat. No. 5,209,499 to Ruff et al.

When a sealing lip fabricated from a material such as PTFE is deformed during assembly and subsequently installed in an operating environment in which it is subjected to significant mechanical stresses, material degradation and a loss of resiliency can occur rapidly. It would be desirable therefore, to increase the service life of a hydrodynamic shaft seal by providing a lay-down lip seal fabricated from an elastomeric material which could be biased into sealing engagement with the sealing surface of the wear sleeve. It would also be desirable to provide such a lip seal with structures to increase the hydrodynamic pumping effect of the sealing element. Examples of lip seals with such structures are disclosed in U.S. Pat. No. 4,441,722 to Pichler and U.S. Pat. No. 4,783,086 to Bras et al.

SUMMARY OF THE INVENTION

The subject invention is directed to a hub seal for installation on the wheel end of a heavy duty trailer or truck which overcomes the inadequacies of prior art hub seals. The hub seal of the subject invention includes an annular casing which defines a radially outer circumferential canal at an outboard side thereof. A thrust ring defined by polymeric material is disposed within the circumferential canal and is dimensioned and configured to support axial loads imposed upon the hub seal during installation. The thrust ring is preferably defined by a continuous ring of polymeric material, although it is envisioned that the ring may be segmented or discontinuous. Those skilled in the art will readily appreciated that the adhesive characteristics of the polymeric material from which the thrust ring is formed facilitates bonding of the thrust ring into the circumferential canal. Preferably, a circumferential lip projects axially into the circumferential canal to increase the bonding surface area thereof.

The hub seal further includes an annular wear sleeve which is mounted coaxial with the annular casing. The annular sleeve includes a deflector ring coated with a releasing material to prevent bonding of the thrust ring to the deflector ring. The deflector ring is provided with means for mechanically removing at least a portion of the thrust ring upon relative rotation of the casing and sleeve so as to create a running clearance between the deflector ring and the thrust ring.

Preferably, the deflector ring includes a circumferential planar surface which extends generally parallel to the plane of the thrust ring to mechanically remove at least a portion of the thrust ring by shearing action. Alternatively, the deflector ring may include a plurality of circumferentially spaced apart tangentially extending flats formed in a radially outer portion thereof for mechanically removing at least a portion of the thrust ring. It is also envisioned that the deflector ring could include a plurality of circumferentially spaced apart radially inwardly extending notches formed in a radially outer portion thereof to mechanically remove at least a portion of the thrust ring.

In a preferred embodiment of the subject invention, a circumferential retaining lip forms a radially inner wall of the circumferential canal. This lip is angled radially outwardly to minimize running torque and direct the movement of material, mechanically removed from the thrust ring by the deflector ring, in a radially outward direction.

The subject invention is also directed to a method of fabricating a hub seal with a machinable thrust ring which includes the steps of providing an annular casing defining a circumferential canal, injecting a polymeric material into the circumferential canal to form a machinable thrust ring, providing an annular sleeve having a deflector ring configured to mechanically remove at least a portion of the thrust ring, and unitizing the annular casing and the annular sleeve so as to position the deflector ring in opposing relationship to the machinable thrust ring. Preferably, the step of injecting the polymeric material into the circumferential canal includes the step of bonding the polymeric material within the canal, and the method further includes the step of coating the deflector ring with a releasing material which prevents bonding of the thrust ring to the deflector ring.

The subject invention is further directed to a hub seal which includes an annular casing, an elastomeric sealing ring supported within the annular casing and including a sealing lip, an annular sleeve mounted coaxial with the annular casing, the annular sleeve having an axially extending sealing surface, and an annular garter spring for biasing the sealing lip against the axially extending sealing surface such that a substantial portion of the sealing lip is in sealing engagement with the sealing surface over a substantially continuous contact area.

Preferably, the sealing lip and the sealing surface are in sealing engagement with one another over a substantially continuous contact area having an axial length of about between 0.020 inches and 0.120 inches. The elastomeric sealing ring is a preferably a composite structure which includes an elastomeric sealing portion and a metallic support portion. In such an instance, the elastomeric sealing portion and the metallic support portion can be bonded to one another, or molded integral with one another. The elastomeric sealing ring may also be configured as a two-part structure in which the elastomeric sealing portion and a metallic support portion are mechanically interfaced with one another to form an integrated structure.

In a preferred embodiment of the subject invention, the sealing lip of the elastomeric sealing portion includes a sealing surface having a plurality of spaced apart projections which provide a hydrodynamic pumping aide during relative rotation of the casing and the sleeve. The spaced apart projections have a generally trapezoidal configuration, with the lateral sides thereof inclined with respect to the axis of the hub seal.

These and other features of the hub seal of the subject invention and the method of fabrication of the hub seal of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the subject invention appertains will more readily understand how to make and use the hub seal of the subject invention, preferred embodiments of the sealing device will be described in detail hereinbelow with reference to the drawings wherein:

FIG. 1 is a perspective view of a hub seal constructed in accordance with a preferred embodiment of the subject invention;

FIG. 2 is an exploded perspective view of a hub seal constructed in accordance with a preferred embodiment of the subject invention, wherein the deflector ring has a planar surface for machining the thrust ring provided on the outboard side of the casing;

FIG. 3 is a side elevational view in cross-section of a portion of the wheel end of a vehicle with the hub seal of the subject invention sealingly mounted therein;

FIG. 7 is an exploded perspective view of yet another hub seal constructed in accordance with a preferred embodiment of the subject invention, wherein the deflector ring includes a plurality of circumferentially spaced apart radially inwardly extending notches formed in a radially outer portion thereof for machining the thrust ring;

FIG. 8 is an exploded perspective view of another hub seal constructed in accordance with a preferred embodiment of the subject invention in which the deflector ring includes a plurality of circumferentially spaced apart tangentially extending flats formed in a radially outer portion thereof for machining the thrust ring;

FIG. 9 is a cross-sectional view of another embodiment of a hub seal assembly constructed in accordance with a preferred embodiment of the subject invention;

FIG. 10 is an enlarged localized cross-sectional view of the hub seal illustrated in FIG. 9 which includes a composite sealing ring subassembly;

FIG. 11 is a cross-sectional view of the sealing ring subassembly illustrated in FIG. 10;

FIG. 12 is a cross-sectional view of another hub seal assembly constructed in accordance with a preferred embodiment of the subject invention;

FIG. 13 is an enlarged localized cross-sectional view of the hub seal assembly of FIG. 12;

FIG. 16 is an elevational view of a portion of the lip seal of the subject invention illustrating a particular geometric configuration of the hydrodynamic pumping aide provided on the sealing surface thereof;

FIG. 17 is an elevational view of a portion of the lip seal of the subject invention illustrating another geometric configuration of the hydrodynamic pumping aide provided on the sealing surface thereof; and FIG. 18 is an elevational view of a portion of the lip seal of the subject invention illustrating yet another geometric configuration of the hydrodynamic pumping aide provided on the sealing surface thereof.

DETAILED DESCRIPTION OF THE PREFERRED EMBODIMENTS

Figure 4:
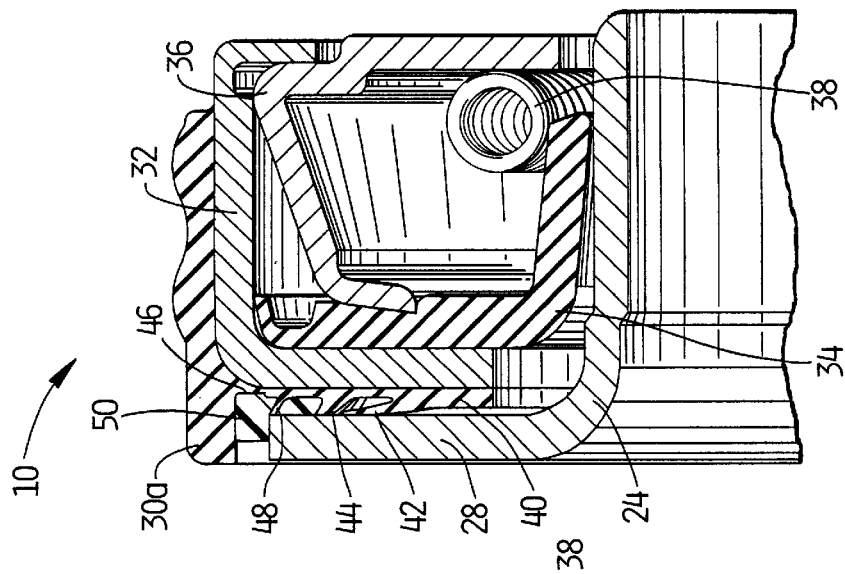
FIG. 4 is a side elevational view in cross-section of the hub seal of the subject invention prior to break-in wherein the thrust ring is wholly intact.

Referring now in detail to the drawings wherein like reference numerals identify similar structural elements of the subject invention, there is illustrated in FIG. 1 a two-part semi-unitized shaft seal assembly constructed in accordance with a preferred embodiment of the subject invention and designated generally by reference numeral 10. As illustrated in FIG. 3, hub seal 10 is adapted and configured to provide a dynamic seal between the interior bore 12 of a wheel hub 14 and an axle shaft 16. Roller bearings 20 are disposed within wheel hub 14 for supporting the rotation of the wheel hub relative to axle shaft 16. Wheel hub 14 defines a chamber for containing a volume of lubricating fluid which continuously bathes roller bearings 20. Shaft 10 serves to seal the lubricant chamber.

Referring now to FIG. 2 in conjunction with FIG. 3, shaft seal 10 includes an outer annular casing 22 and an inner metallic wear sleeve 24. Casing 22 and wear sleeve 24 are assembled together to form a two-part, separable, semi-unitized seal assembly, as best seen in FIG. 1. Wear sleeve 24 includes an axially extending portion 26 and a radially outwardly extending portion 28. The axially extending portion 26 is dimensioned and configured to be press-fit onto the outer diameter of axle shaft 16. The radially outwardly extending flange portion 28 of wear sleeve 24 defines an annular deflector ring which opposes the outboard side of the annular outer casing 22 when the casing and sleeve are assembled.

Referring to FIG. 3 in conjunction with FIG. 4, the outer casing 22 of shaft seal 10 includes an elastomeric radially outer hub engagement ring 30, a primary metallic reinforcing ring 32, a primary elastomeric sealing ring 34, and a secondary metallic reinforcing ring 36. The outer hub engagement ring 30 is formed with a pair of axially spaced apart circumferential compression ribs 35 and 37 which are configured to be compressed, as much as 50% of their radial height, against the surface of the interior bore 12 of wheel hub 14 during installation. The hub engagement ring 30 is bonded to the outer surface of the axially extending portion 32a of the primary reinforcing ring 32. The primary sealing ring 34 includes a radially extending portion 34a positioned against the interior surface of the radially extending portion 32b of primary reinforcing ring 32 and an axially extending portion 34b which is biased radially inwardly by an annular garter spring 38. Garter spring 38 urges the axially extending portion 34b of sealing ring 34 into sealing contact with the radially outer surface of the axially extending portion 26 of wear sleeve 24 to effect a seal therebetween. As a result, the axially extending portion 34b of the elastomeric sealing ring 34 is in continuous sealing engagement with the outer surface of the axially extending portion 26 of wear sleeve 24 over a substantial contact area.

With continuing reference to FIG. 4, the secondary reinforcing ring 36 of hub seal 10 includes a radially extending portion 36c and a radially extending lip portion 36a which are connected by an angled axially extending portion 36b. The radially extending portion 36a supports garter spring 38 in its operative position, and the radially depending lip portion 36c compresses the radially extending portion 34a of primary sealing ring 34 against the interior surface of the radially extending portion 32b of primary reinforcing ring 32. The primary reinforcing ring 32 includes a radially depending lip portion 32c which engages a radially inset land area 36d formed between the axially extending portion 36b and radially extending portion 36a of secondary reinforcing ring 36. The engagement of these two structure facilitates integration of the outer casing 22 of shaft seal 10.

An elastomeric rib structure 40, preferably formed integral with hub engagement ring 30, is bonded to the outer surface of the radially extending portion 32b of primary reinforcing ring 32. Rib structure 40 defines a flexible lip 42 configured to decrease the running torque between the deflector ring 28 and the outboard side of the casing 32 during vehicle operation. Rib structure 40 further defines a flexible retaining lip 44 delimiting the inner wall of a circumferential canal 46, the outer wall of which is delimited by an axial extension 30a of hub engagement ring 30.

A polymeric thermoplastic material, such as, for example, polypropylene, is deposited into the circumferential canal 46, preferably by means of a conventional injection process, to form a thrust ring 50 upon hardening and setting. The polymeric material which forms thrust ring 50 has adhesive characteristics which serve to effect bonding of the material to the structural surfaces defining the circumferential canal 46. In addition, an upstanding lip 48 projects into canal 46 from race structure 40 to increase the bonding surface area for the polymeric/adhesive material of thrust ring 50.

Thrust ring 50 is configured to act as a conventional spring-back bumper element to absorb the axial load exerted on shaft seal 10 when it is press-fit onto axle shaft 16 during installation. In accordance, with a preferred embodiment of the subject invention, thrust ring 50 is a machinable sacrificial structure configured to be partially sheared away during the break-in period of shaft seal 10. More particularly, the deflector ring 28 of wear sleeve 24, is configured to mechanically remove at least a portion of thrust ring 50 during break-in to create a running clearance between the deflector ring 28 and the thrust ring 50. Specifically, deflector ring 28 has a generally planar surface 28 which is initially compressed against thrust ring 50 during installation, and which, through rotation during the break-in period of the shaft seal, functions to machine away a portion of the thrust ring by shearing action.

During the break-in period, there is an initial increase in start-up torque due to the presence of the thrust ring 50. However, after only a few revolutions of the wheel hub, the torque applied to the shaft seal rapidly decreases as the thrust ring is machined away to create a running clearance. In addition, because the running clearance is created in a relatively short period of time, there is not a substantial increase in frictional heat generation in the area of the thrust ring. Moreover, during the break-in period, the temperatures at the interface between the thrust ring and the deflector ring will remain well below the melting point of the polymeric material from which the thrust ring is formed, thereby maintaining the integrity of the shaft seal.

In a preferred embodiment of the subject invention, because the material from which thrust ring 50 is formed has adhesive characteristics, which are enhanced as the temperature of the material increases, a lubricant, in the form of a releasing material, such as, for example, Krytox™ is provided on the planar machining surface of deflector ring 28, in the form of a coating designated by reference numeral 60, to prevent material parted from the thrust ring 50 from bonding with the deflector ring 28 during the break-in period (See FIG. 2). As set forth hereinabove, the radially inner wall of the circumferential canal 46 is delimited by a retaining lip 44. This structure is angled in a radially outward direction to direct the movement of material parted from thrust ring 50 in a radially outward direction, thereby preventing contamination of shaft seal 10. In addition, retaining lip 44 serves to decrease running torque in conjunction with flexible lip 42.

Figure 5:
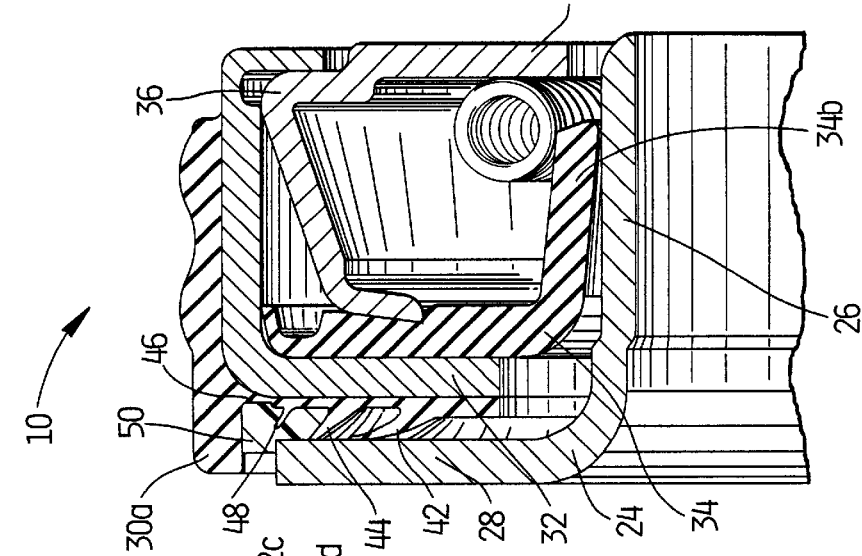
FIG. 5 is a side elevational view in cross-section of the hub seal of the subject invention shortly after break-in commences with the thrust ring partially removed.
Figure 6:
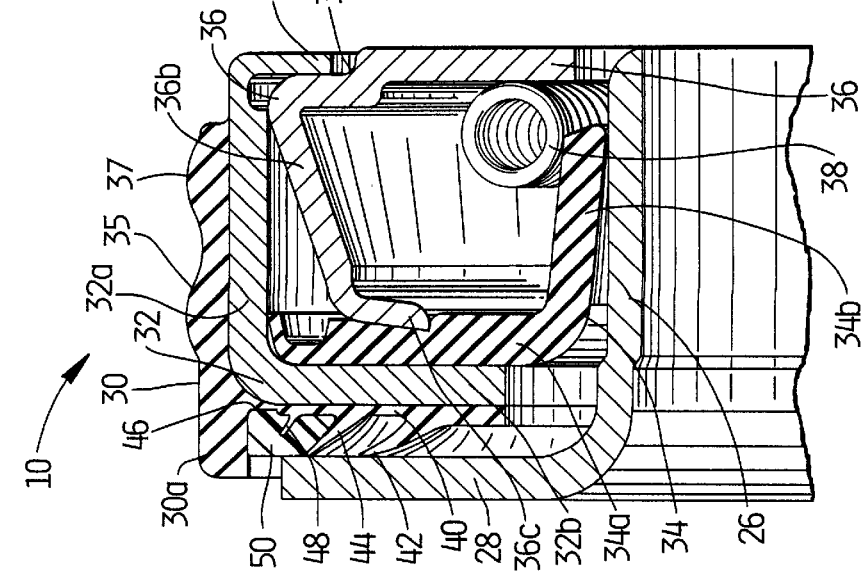
FIG. 6 is a side elevational view in cross-section of the hub seal of the subject invention subsequent to break-in with a sufficient portion of the thrust ring removed so as to create a running clearance between the deflector ring and the thrust ring.

Referring now to FIGS. 4 through 6, there is illustrated, in sequential order, a rendering of the manner in which a portion of thrust ring 50 is mechanically removed by the deflector ring 28 when the outer casing 22 and wear sleeve 24 rotate relative to one another during the break-in period of shaft seal 10. More particularly, as illustrated in FIG. 4, during installation of the shaft seal and prior to break-in, thrust ring 50 remains wholly intact, but in a slightly compressed state in response to the forces exerted thereupon by the deflector ring during installation. At such a time, a desirable degree of spacing is maintained between the casing and the deflector ring. Then, as illustrated in FIG. 5, when break in begins, so does the mechanical removal of the thrust ring 50 by the machining surface of the deflector ring 28.

As illustrated in FIG. 6, after only a few wheel revolutions, a minimal running clearance is created between thrust ring 50 and defector ring 28, and the torque applied to the shaft seal falls to a normal running level, minimized by flexible lip 42 and retention lip 44. During the break-in period, the temperature of the shaft seal in the area of thrust ring 50 remains well below the melting point of the polymeric material from which the thrust ring is formed, thus ensuring the integrity of the shaft seal of the subject invention.

Referring now to FIGS. 7 and 8, there are illustrated two other shaft seals constructed in accordance with a preferred embodiment of the subject invention and designated generally by reference numerals 100 and 200, respectively. Shaft seal 100 includes an outer casing 122 which is constructed in the same manner as outer casing 22 of shaft seal 10. However, the wear sleeve 124 of shaft seal 100 differs from the wear sleeve 24 of shaft seal 10 in that it includes four circumferentially spaced apart radially inwardly extending notches 128a through 128d formed in a radially outer portion of the deflector ring 128, as illustrated in FIG. 7, for mechanically removing at least a portion of a machinable thrust ring provided on the outboard side of outer casing 122. Similarly, as illustrated in FIG. 8, the wear sleeve 224 of shaft seal 200 differs from the wear sleeve 24 of shaft seal 10 in that it includes four circumferentially spaced apart tangentially extending flats 228a through 228d formed in a radially outer portion of the deflector ring 128 for mechanically removing at a least a portion of a machinable thrust ring provided on the outboard side of outer casing 222.

Referring now to FIG. 9, there is illustrated another hub seal constructed in accordance with a preferred embodiment of the subject invention and designated generally by reference numeral 300. Hub seal 300 includes an outer annular casing 322 and an inner metallic wear sleeve 324. As in the previously described embodiments, the wear sleeve and casing form a two-part, semi-unitized seal assembly for use on the wheel end of a vehicle. Moreover, the wear sleeve is designed to be press-fit onto the outer diameter of a vehicle axle shaft.

As best seen in FIG. 10, the outer casing 322 of hub seal 300 includes a composite sealing ring 334 which includes an elastomeric sealing portion 335 and a circumferential metallic support portion 337. The two structural portions of sealing ring 334 are preferably molded to one another during an injection molding process. Alternatively, the two structural components of composite sealing ring 334 may be bonded all to one another using conventional techniques. The elastomeric sealing portion 335 of composite sealing ring 334 includes a radial sealing lip 339 of the type commonly refereed to as a lay-down lip seal which is dimensioned and configured to sealingly engage the outer surface of the axially extending portion 326 of wear sleeve 324 over a substantial contact area having an axial length of about between 0.020 inches and 0.120 inches. An annular garter spring 338 biases sealing lip 339 into sealing engagement with the outer surface of the axially extending portion 326 of wear sleeve 324 by providing radially inwardly directed forces.

As best seen in FIG. 10, the outer casing 322 of hub seal 300 includes an outer hub engagement ring 330 and an inner secondary reinforcing ring 336. Hub engagement ring 330 includes a radially extending portion 330a, an axially extending portion 330b and a radially depending portion 330c. Reinforcing ring 336 includes a radially extending portion 336a, an axially extending portion 336b and radially depending portion 336c.

In the assembled condition illustrated in FIG. 10, the radially depending portion 330c of engagement ring 330 mechanically interfaces with the radially extending portion 336a of reinforcing ring 336. In addition, the axially extending base portion of composite sealing ring 335 is interposed within the gap that exists between the radially depending portion 336c of reinforcing ring 336 and the radially extending portion 330a of engagement ring 330, together with a compressible abutment ring 341 which acts as a shim for the radially depending portion 336c. As in each of the previously described embodiments, hub seal 300 includes a machinable thrust ring 350 which is deposited in a circumferential canal 346 formed in the outer casing which serves as a sacrificial bumper element that is mechanically removed by the radially extending portion 328 of wear sleeve 324 during the break-in period of the seal assembly.

Referring now to FIG. 11, the composite sealing ring 335 is molded in such a manner so as provide the lay-down sealing lip 339 with a particular trim height, approach angle, molded lip angle and trim angle to maximize the extent of the axial sealing contact at the interface between the elastomeric sealing lip and the sealing surface of the wear sleeve. A molded lip seal constructed in this manner has a trimmed inboard end surface providing a radiused leading edge 345, as illustrated, for example, in FIG. 10. In a preferred embodiment of the subject invention, the trim height of the lip is about 0.339±0.008 inches, the approach angle is about between 20° and 30°, the molded lip angle is about 100°±0.5° and the trim angle is about 20°±0.003° relative to a plane extending perpendicular to the axis of the seal. Also in a preferred embodiment of the subject invention, the sealing lip 339 at its smallest diameter is about between 0.020 inches and 0.100 inches smaller than the axial sealing member with which it makes contact, such that a radial force component exists between the two contacting elements which causes the sealing lip to lay down on the axial sealing member over a portion of its length.

With continuing reference to FIG. 11, the inner sealing surface of sealing lip 339 is provided with a plurality of spaced apart projections 375 which serve as hydrodynamic pumping aides to facilitate the movement of lubricant fluid on the axle shaft in an axial direction toward and back into the bearing chamber of the wheel hub. Projections 375 are molded integral with the sealing lip and preferably have a trapezoidal geometry with the lateral sides thereof being inclined at an angle with respect to the axis of the hub seal assembly. Alternatively, the projections can have triangular or rod-like geometries, as shown, for example in FIGS. 16 through 18, and can be attached to one another by a raised bridging structure. In a preferred embodiment of the subject invention, the spaced apart projections are located at about between 0.020 inches and 0.075 inches from the radially inner edge of the sealing lip. Preferably, the projections are raised about 0.002 inches from the surface of the sealing lip.

Referring now to FIGS. 12 and 13, there is illustrated another hub seal assembly constructed in accordance with a preferred embodiment of the subject invention and designated generally by reference numeral 400. Hub seal assembly 400 includes a stepped annular casing 422 and a wear sleeve 434. Casing 422 has first and second casing portions 422a and 422b which are overlaid exteriorly by an elastomeric hub engagement shell 430, which, in part, defines the radially outer boundary of a circumferential canal 446 within which may be deposited a machinable thrust ring of the type described in connection with the previously described embodiments of the invention.

Figure 14:
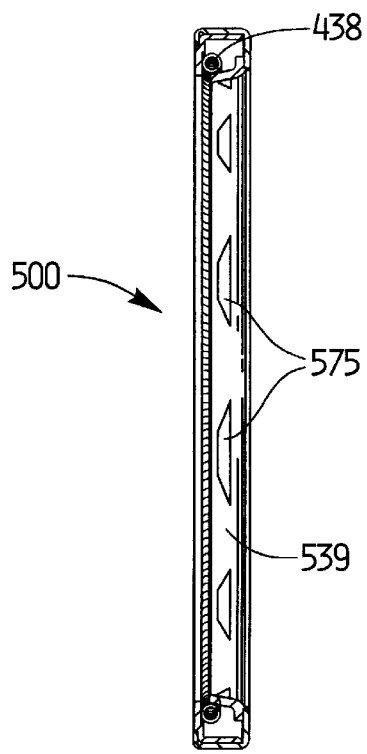
FIG. 14 is a cross-sectional view of the lip seal cartridge which forms part of the hub seal assembly of FIG. 13.
Figure 15:
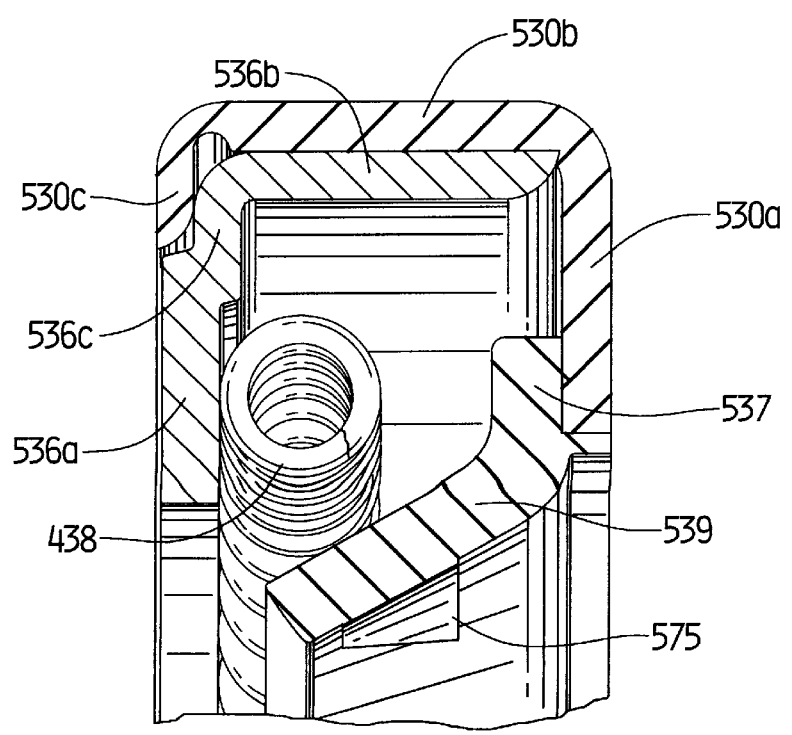
FIG. 15 is an enlarged localized cross-sectional view of the lip seal cartridge illustrated in FIG. 14.

The first portion of casing 422 encloses an annular lip seal cartridge which is designated generally by reference numeral 500 and separately illustrated in FIGS. 14 and 15. Lip seal cartridge 500 includes an outer support ring 530 and a cooperative inner reinforcing ring 536. Outer support ring 530 includes a radially extending portion 530a, an axially extending portion 530b and a radially depending portion 530c, while inner reinforcing ring 536 includes a radially extending portion 536a and an axially extending portion 536b. The radially depending portion 530c of support ring 530 mechanically interfaces with a shoulder portion 536c of reinforcing ring 536 to facilitate unitization of lip seal cartridge 500.

With continuing reference to FIG. 15, in conjunction with FIG. 13, cartridge 500 further includes an elastomeric sealing ring 534 which includes a base portion 537 and a radial sealing lip 539. In contrast to the composite sealing ring 334 of hub seal assembly 300 described hereinabove, the base portion 537 of elastomeric sealing ring 534 is secured to the radially inner end of the radially extending portion 530a of support portion 530 by conventional bonding methods known in the art. The radial sealing lip 539 is molded in such a manner, so as to form, what is commonly referred to as a lay-down lip seal. Moreover, it is dimensioned and configured in such a manner so as to sealingly engage the outer surface of the axially extending portion 426 of wear sleeve 434 over a substantially continuous contact area. As in the previously described embodiments, an annular garter spring 438 is provided to bias the elastomeric sealing lip 539 into sealing engagement with the outer surface of the axially extending portion 426 of wear sleeve 424 by providing radially inwardly directed forces.

Referring to FIG. 14, the inner sealing surface of radial sealing lip 539 is provided with a plurality of spaced apart projections 575 which serve as hydrodynamic pumping aides to facilitate the movement of lubricant fluid on the axle shaft in axial direction toward and back into a lubricant reservoir. Projections 575 are molded integral with sealing lip 539 and have a trapezoidal geometry. As in the previous embodiment, the molded projections can have alternative geometries, as illustrated for example in FIGS. 16 through 18.

Although the hub seal of the subject invention has been described with respect to a preferred embodiment, it is apparent that modifications and changes can be made thereto without departing from the spirit and scope of the invention as defined by the appended claims.

What is claimed is:

1. A hub seal for installation on the wheel end of a vehicle comprising:
   a) an annular casing;
   b) an elastomeric sealing ring supported within said annular casing and including a sealing lip defining an angled seal face having a trimmed inboard end surface providing a radiused leading edge;
   c) an annular sleeve mounted coaxial with said annular casing, said annular sleeve having an axially extending sealing surface; and
   d) an annular spring for biasing said sealing lip against said axially extending sealing surface such that a substantial portion of said sealing lip is in sealing engagement with said sealing surface over a substantially continuous contact area extending from the trimmed inboard end surface of the angled seal face.

2. A hub seal as recited in claim 1, wherein said sealing lip and said sealing surface are in sealing engagement over a contact area having an axial length of about between 0.020 inches and 0.120 inches.

3. A hub seal as recited in claim 1, wherein said elastomeric sealing ring is a composite structure which includes an elastomeric sealing portion and a metallic support portion.

4. A hub seal as recited in claim 3, wherein said sealing lip includes a sealing surface, said sealing surface having a plurality of spaced apart projections which provide a hydrodynamic pumping aide during relative rotation of said casing and said sleeve.

5. A hub seal as recited in claim 4, wherein the spaced apart projections have a generally trapezoidal configuration, with the lateral sides thereof inclined with respect to the axis of said hub seal.

6. A hub seal as recited in claim 1, wherein said spring comprises an annular garter spring.

7. A hub seal as recited in claim 1, wherein said elastomeric sealing ring and said annular spring reside within a cartridge supported within said annular casing.

8. A hub seal as recited in claim 1, wherein said annular casing includes a radially outer circumferential canal at outboard side thereof, and a thrust ring defined by a ring of polymeric material is deposited within said circumferential canal, said thrust ring being dimensioned and configured to support axial loads imposed upon said hub seal during installation.

9. A hub seal as recited in claim 8, wherein said annular sleeve includes a deflector ring opposing said outboard side of said annular casing, said deflector ring configured to mechanically remove a sufficient portion of said thrust ring upon relative rotation of said annular casing and said annular sleeve to create a minimal running clearance between said deflector ring and said thrust ring.

10. A hub seal as recited in claim 9, wherein said deflector ring includes a circumferential machining surface extending generally parallel to said thrust ring for mechanically removing at least a portion of said thrust ring.

11. A hub seal as recited in claim 9, wherein said deflector ring includes a plurality of circumferentially spaced apart tangentially extending flats formed in a radially outer portion thereof for mechanically removing at least a portion of said thrust ring.

12. A hub seal as recited in claim 9, wherein said deflector ring includes a plurality of circumferentially spaced apart radially inwardly extending notches formed in a radially outer portion thereof for mechanically removing at least a portion of said thrust ring.

13. A hub seal for installation on the wheel end of a vehicle comprising:
   a) an annular casing;
   b) an elastomeric sealing ring supported within said annular casing and including a spring biased sealing lip defining an angled seal face having a trimmed inboard end surface providing a radiused leading edge; and
   c) an annular sleeve mounted coaxial with said annular casing, said annular sleeve having an axially extending sealing surface, whereby said spring biased sealing lip and said axially extending sealing surface are in sealing engagement over a substantially continuous contact area extending from the trimmed inboard end surface of the angled seal face.

14. A hub seal as recited in claim 13, wherein said sealing lip and said sealing surface are in sealing engagement over a contact area having an axial length of about between 0.020 inches and 0.120 inches.

15. A hub seal as recited in claim 13, wherein said elastomeric sealing ring is a composite structure which includes an elastomeric sealing portion and a metallic support portion.

16. A hub seal as recited in claim 13, wherein said sealing lip includes a sealing surface, said sealing surface having a plurality of spaced apart projections which provide a hydrodynamic pumping aide during relative rotation of said casing and said sleeve.

17. A hub seal as recited in claim 16, wherein the spaced apart projections have a generally trapezoidal configuration, with the lateral sides thereof inclined with respect to the axis of said hub seal.

18. A hub seal as recited in claim 13, further comprising an annular garter spring for biasing said sealing lip into sealing engagement with said sealing surface.

19. A hub seal as recited in claim 13, wherein said elastomeric sealing ring reside within a cartridge supported within said annular casing.

20. A sealing structure for a vehicle hub seal having a radially outer casing member and a radially inner sleeve member comprising:
   a) an elastomeric sealing portion supported within the outer casing of the vehicle hub seal and including an sealing lip defining an angled seal face having a trimmed inboard end surface providing a radiused leading edges, the sealing lip being dimensioned and configured to sealingly engage a substantial portion of an axially extending sealing surface of the inner sleeve member over a substantially continuous contact area extending from the trimmed inboard end surface of the angled seal face; and
   b) a metallic support portion assembled with said elastomeric sealing portion to add structural rigidity to said elastomeric sealing portion.

21. A sealing structure as recited in claim 20, wherein said elastomeric sealing portion and said metallic support portion are bonded to one another.

22. A sealing structure as recited in claim 18, wherein said elastomeric sealing portion and said metallic support portion are molded integral with one another.

23. A sealing structure as recited in claim 18, wherein said sealing lip is dimensioned and configured such that said sealing lip and said sealing surface are in sealing engagement over a contact area having an axial length of about between 0.020 inches and 0.120 inches.

24. A sealing structure as recited in claim 20, wherein said sealing lip includes a sealing surface, said sealing surface having a plurality of spaced apart projections which provide a hydrodynamic pumping aide during relative rotation of the casing and sleeve.

25. A sealing structure as recited in claim 20, wherein the spaced apart projections have a generally trapezoidal configuration.

26. A sealing structure as recited in claim 20, wherein the spaced apart projections have a generally triangular configuration.

27. A sealing structure as recited in claim 20, wherein the spaced apart projections have a generally rod-like configuration.

* * * * *

UNITED STATES PATENT AND TRADEMARK OFFICE
CERTIFICATE OF CORRECTION

PATENT NO. : 6,170,833
DATED : January 09, 2001
INVENTOR(S) : Jon A. Cox; C. Leon Lovett; Mark N. Gold; and Laurence B. Winn It is certified that error appears in the above-identified patent and that said Letters Patent are hereby corrected as shown below:

In the Claims:

Col. 12, line 11, delete "edges" and insert -- edge -- therefor.

Signed and Sealed this

Fifteenth Day of May, 2001

*Attest:*

NICHOLAS P. GODICI

*Attesting Officer*     *Acting Director of the United States Patent and Trademark Office*